(12) United States Patent
Huene et al.

(10) Patent No.: US 8,079,018 B2
(45) Date of Patent: Dec. 13, 2011

(54) TEST IMPACT FEEDBACK SYSTEM FOR SOFTWARE DEVELOPERS

(75) Inventors: Peter C. Huene, Seattle, WA (US); John A. Cunningham, Kirkland, WA (US); Boris V. Vidolov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 11/944,435

(22) Filed: Nov. 22, 2007

(65) Prior Publication Data

US 2009/0138855 A1 May 28, 2009

(51) Int. Cl.
G06F 9/44 (2006.01)
(52) U.S. Cl. ........ 717/124; 717/125; 717/126; 717/131; 714/38.1
(58) Field of Classification Search .................. None
See application file for complete search history.

(56) References Cited

U.S. PATENT DOCUMENTS

| | | | | |
|---|---|---|---|---|
| 5,436,912 A * | 7/1995 | Lustig | | 714/719 |
| 5,754,760 A * | 5/1998 | Warfield | | 714/38.1 |
| 5,787,286 A * | 7/1998 | Hooker | | 717/130 |
| 6,070,255 A * | 5/2000 | Dell et al. | | 714/48 |
| 6,199,198 B1 * | 3/2001 | Graham | | 717/105 |
| 6,256,773 B1 * | 7/2001 | Bowman-Amuah | | 717/121 |
| 6,393,490 B1 | 5/2002 | Stiles et al. | | |
| 6,405,364 B1 * | 6/2002 | Bowman-Amuah | | 717/101 |
| 6,427,000 B1 | 7/2002 | Mumford et al. | | |
| 6,591,413 B1 | 7/2003 | Humphrey et al. | | |
| 6,701,345 B1 * | 3/2004 | Carley et al. | | 709/205 |
| 6,769,114 B2 | 7/2004 | Leung | | |
| 7,046,640 B2 * | 5/2006 | Silva et al. | | 370/318 |
| 7,069,541 B2 | 6/2006 | Dougherty et al. | | |
| 7,111,285 B2 * | 9/2006 | Smith et al. | | 717/140 |
| 7,315,826 B1 * | 1/2008 | Guheen et al. | | 705/7.29 |
| 7,793,271 B2 * | 9/2010 | Raffo | | 717/135 |
| 7,861,226 B1 * | 12/2010 | Episkopos et al. | | 717/124 |
| 7,886,272 B1 * | 2/2011 | Episkopos et al. | | 717/124 |
| 2003/0018906 A1 * | 1/2003 | Smith et al. | | 713/189 |
| 2003/0131342 A1 | 7/2003 | Bates et al. | | |
| 2003/0204836 A1 * | 10/2003 | Srivastava et al. | | 717/124 |
| 2004/0107125 A1 * | 6/2004 | Guheen et al. | | 705/7 |
| 2004/0243387 A1 | 12/2004 | De Brabander | | |
| 2005/0138602 A1 * | 6/2005 | Hinchey et al. | | 717/106 |
| 2006/0161890 A1 * | 7/2006 | Green | | 717/114 |
| 2006/0236156 A1 * | 10/2006 | Cunningham et al. | | 714/38 |
| 2007/0277163 A1 * | 11/2007 | Avresky | | 717/140 |
| 2008/0256393 A1 * | 10/2008 | Ur | | 714/38 |
| 2009/0070734 A1 * | 3/2009 | Dixon et al. | | 717/102 |
| 2009/0089618 A1 * | 4/2009 | Rajan et al. | | 714/33 |

OTHER PUBLICATIONS

Title: Prioritize code for testing to improve code coverage of complex software, author: Li J.J et al, source: IEEE dated: Nov. 1, 2005.*

(Continued)

Primary Examiner — Chameli Das

(57) ABSTRACT

Various technologies and techniques are disclosed for facilitating a feedback process regarding the impact that changes to source code will have on tests. Changes contained in at least one source code file are analyzed in combination with code coverage information contained in a data store for a plurality of tests to determine when any of the tests will be impacted by the changes. When at least one test is determined to be impacted by the changes made to the source code file, a warning notification is displayed to a user to notify the user of a possible impact of the changes on the at least one test.

23 Claims, 8 Drawing Sheets

OTHER PUBLICATIONS

Title: Test coverage analysis based on program slicing , Chen et al, source: IEEE, dated Jan. 8, 2004.*

Murphy, "Test-Driven Development using csUnit in C#Builder", Date: Jan./Feb. 2004, The Developers Group Magazine. pp. 1-12.

Hundhausen, et al., "An Experimental Study of the Self-Selection on Novice Programming", Date: Jun. 2006, Washington State University, Pullman, WA. pp. 1-30.

Nagappan, et al., "Providing Test Quality Feedback Using Static Source Code and Automatic Test Suite Metrics", Microsoft Research, Redmond, WA. pp. 1-10, Date: Aug. 2005.

Sarah Smith Heckman, "Adaptively Ranking Alerts Generated from Automated Static Analysis", http://www.acm.org/crossroads/xrds14-1/adaptive.html, Date: Sep. 2007.

* cited by examiner

300

| TEST VIEW | _ ☐ X |
|---|---|
| ⮕▼ [ALL COLUMN]▼ <TYPE KEYWORD>▼ | |
| ⓘ GROUP BY: TEST IMPACT STATUS; ITEM(S) SELECTED: 1 | |

| TEST NAME ▲ | TEST IMPACT... |
|---|---|
| ⊟ RECOMMENDED ——— 302 | |
|     CREATEFILLPATHTEST | RECOMMENDED |
|     CREATESERIESPATHTEST | RECOMMENDED |
|     POINTTEST | RECOMMENDED |
|     READWAVEFORMDATATEST | RECOMMENDED |
| ⊟ VERIFIED ——— 304 | |
|     CREATEWAVEFORMDATATEST | VERIFIED |
|     PATIENTVITALSCONSTRUCTO... | VERIFIED |
|     WAVEFORMDATACONSTRUCTORTEST | VERIFIED |
| ⊟ NOT IMPACTED ——— 306 | |
|     ADDVALUETEST | NOT IMPACTED |
|     CHARTCONSTRUCTORTEST | NOT IMPACTED |
|     CREATECHARTTESTWITHDIMENSIONS | NOT IMPACTED |
|     CREATEFILLFIGURETEST | NOT IMPACTED |
|     CREATESERIESFIGURETEST | NOT IMPACTED |
|     FILLSTYLETEST | NOT IMPACTED |
|     GRIDSTYLETEST | NOT IMPACTED |
|     PARENTTEST | NOT IMPACTED |
|     SERIALIZATIONHELPERCONSTRUC | NOT IMPACTED |
|     SERIESDATAITEMCONSTRUCTORTEST | NOT IMPACTED |
|     SHADOWBRUSHTEST | NOT IMPACTED |
|     SHADOWSTYLETEST | NOT IMPACTED |
|     UPDATEINTERVALTEST | NOT IMPACTED |
|     VALUETEST | NOT IMPACTED |
|     WAVEFORMCONSTRUCTORTEST | NOT IMPACTED |

FIG. 6

TEST IMPACT FEEDBACK SYSTEM FOR SOFTWARE DEVELOPERS

BACKGROUND

Software developers develop software applications using one or more software development programs. These software development programs allow developers to modify the source code that specifies the commands that enable the software application to perform the desired functionality. As part of the software development process, tests are created to ensure that the particular software application operates as intended. There can be different types of tests. Some tests may be designed to test the user interface and ensure that particular options are processed correctly. Other tests may be designed to test the data itself to make sure the data is stored and/or calculated correctly. Numerous types of tests can be used to test the functionality of a given software application. Some tests are performed in an automated fashion without supervision of a user, while other tests are performed by a tester, who manually performs the test to see if the desired result is achieved.

A software developer who makes changes to the source code does not know whether or not his/her change will impact one or more tests. Thus, he/she typically just runs all tests to see what type of impact the change to the source code will have on the tests. The volume of tests is often not manageable, as it could sometimes take days to run all of the tests. Even when the developer runs all of the tests, the developer is still faced with the challenge of understanding what those tests actually do as part of determining the impact that the source code changes will actually have on the tests.

SUMMARY

Various technologies and techniques are disclosed for facilitating a feedback process regarding the impact that changes to source code will have on tests. Changes contained in at least one source code file are analyzed in combination with code coverage information contained in a data store for a plurality of tests to determine when any of the tests will be impacted by the changes. When at least one test is determined to be impacted by the changes made to the source code file, a warning notification is displayed to a user to notify the user of a possible impact of the changes on the at least one test.

In one implementation, a method for providing test impact feedback to a user is described. A determination is made as to whether or not at least one newly changed code element is present in a plurality of code elements contained in a file. When at least one newly changed code element is present, a data store is queried to determine if any tests are impacted based upon the at least one newly changed code element. When a test is determined to be impacted based upon the at least one newly changed code element, an impact status of the test is displayed to a user.

In another implementation, a method for populating code coverage information for use in a test impact feedback process is described. An automated build process is started. Code element information is published to a data store. A plurality of automated build tests are run with code coverage collection turned on. Code coverage information is published to the data store for any tests that were passed.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a simulated screen for one implementation illustrating an exemplary notification list that identifies which tests are recommended for verification, which tests have been verified, and which tests are not impacted.

DETAILED DESCRIPTION

The technologies and techniques herein may be described in the general context as an application that provides feedback regarding the impact changes to source code or other application components will have on tests, but the technologies and techniques also serve other purposes in addition to these. In one implementation, one or more of the techniques described herein can be implemented as features within a software development program such as MICROSOFT® VISUAL STUDIO®, or from any other type of program or service that allows for creation and/or testing of software applications.

Figure 1:
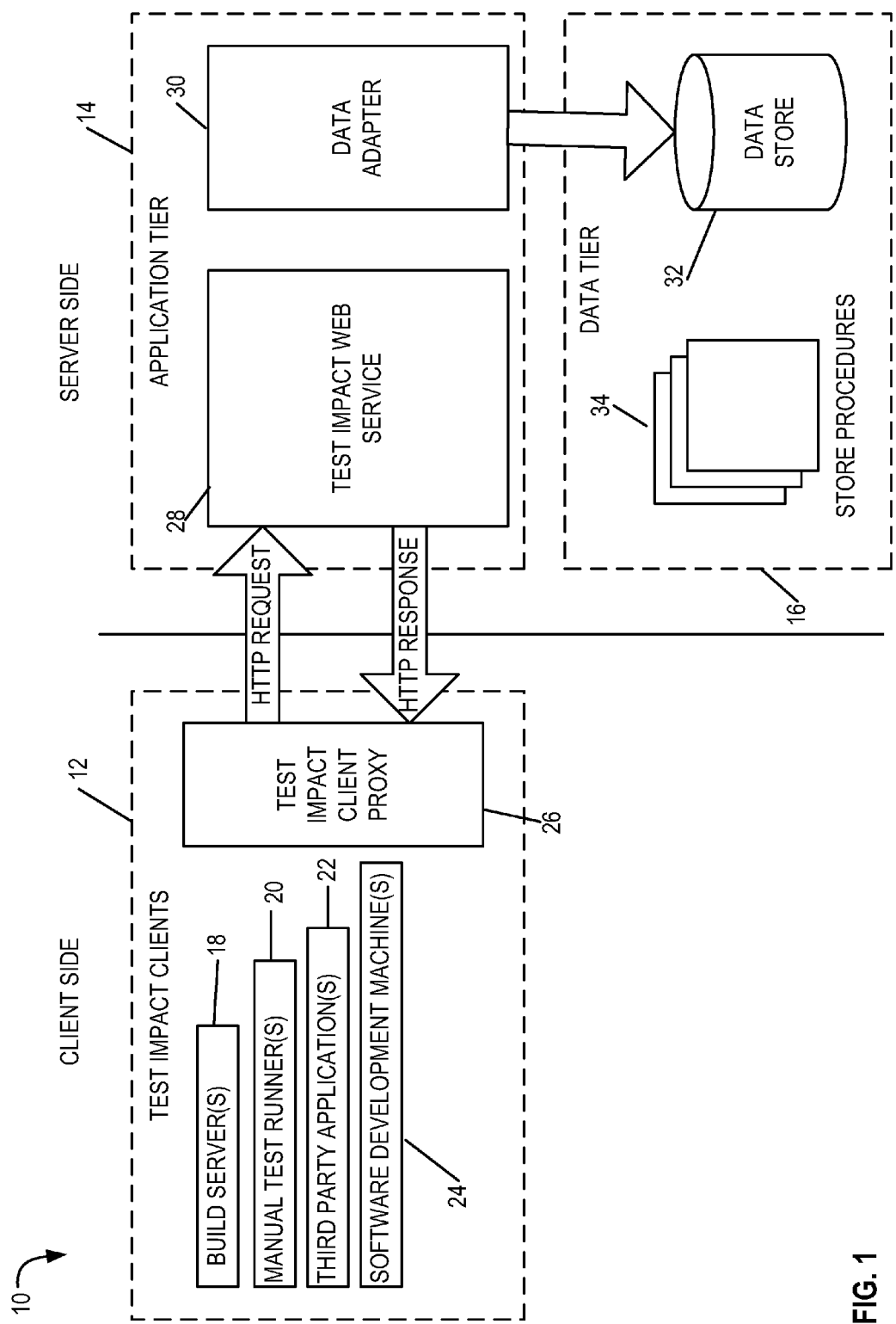
FIG. 1 is a diagrammatic view of a test impact feedback system of one implementation.

FIG. 1 is a diagrammatic view of a test impact feedback system 10 of one implementation. Test impact feedback system 10 includes a client side that has test impact clients 12, and also includes a server side that has an application tier 14 and a data tier 16. In the example implementation shown in FIG. 1, a web service 28 is used with a data adapter 30 to communicate with the data store 32 from the test impact clients 12. In order to communicate with the test impact web service 28 from one or more of the test impact clients 12, a test impact client proxy 26 is used. In one implementation, the test impact client proxy 26 is responsible for communicating with the test impact web service 28 using HTTP request and HTTP response protocols. HTTP request and HTTP response protocols are one common form of communicating with web services over a network such as the Internet. Other communication protocols could also be used in other implementations.

The test impact web service 28 then uses a data adapter 30 or other mechanism for communicating with the data store 32 and/or stored procedures 34 that interact with data store 32. It should be noted that the use of a test impact web service 28 is optional, and is provided in FIG. 1 for the sake of illustration of an exemplary implementation. In other implementations, a test impact web service 28 is not used, and other mechanisms are used to connect with data store 32, such as upon direct connection from one or more of test impact clients 12, over a network, and/or in other variations as would occur to one in the computer software art for allowing test impact clients 12 to communicate with data store 32.

Test impact clients 12 can include build server(s) 18, manual test runner(s) 20, third party application(s) 22, and software development machine(s) 24. Test impact clients 12 can each be located on separate computing devices, and/or on some or all of the same computing devices depending on the configuration. Test impact clients 12 are responsible for creating, updating, and/or viewing information that is stored in data store 32. For example, in one implementation, build server(s) 18, manual test runner(s) 20, and third party application(s) 22 are generally responsible for the creation and maintenance of test impact data in the data store 32, while software development machine(s) 24 interact with the data in the data store 32 to help notify users of impacts that source code or other changes will have on tests.

Test impact clients 12 will now each be described in further detail. In one implementation described in further detail in FIG. 2, build server(s) 18 are used to run automated build tests with code coverage turned on. The term "code coverage" as used herein is meant to include a recording of associations between source code and/or other application components with tests based upon an actual execution of the application. A few non-limiting examples of other application components can include database objects such as stored procedures, tables, views, triggers, etc., as well as other application objects. This code coverage information is recorded in data store 32. In this example, when the build server(s) 18 gather code coverage information from running the automated build tests, a test impact client proxy 26 is used to communicate with the test impact web service 28, which then uses the data adapter 30 to communicate with the data store 32.

Figure 3:
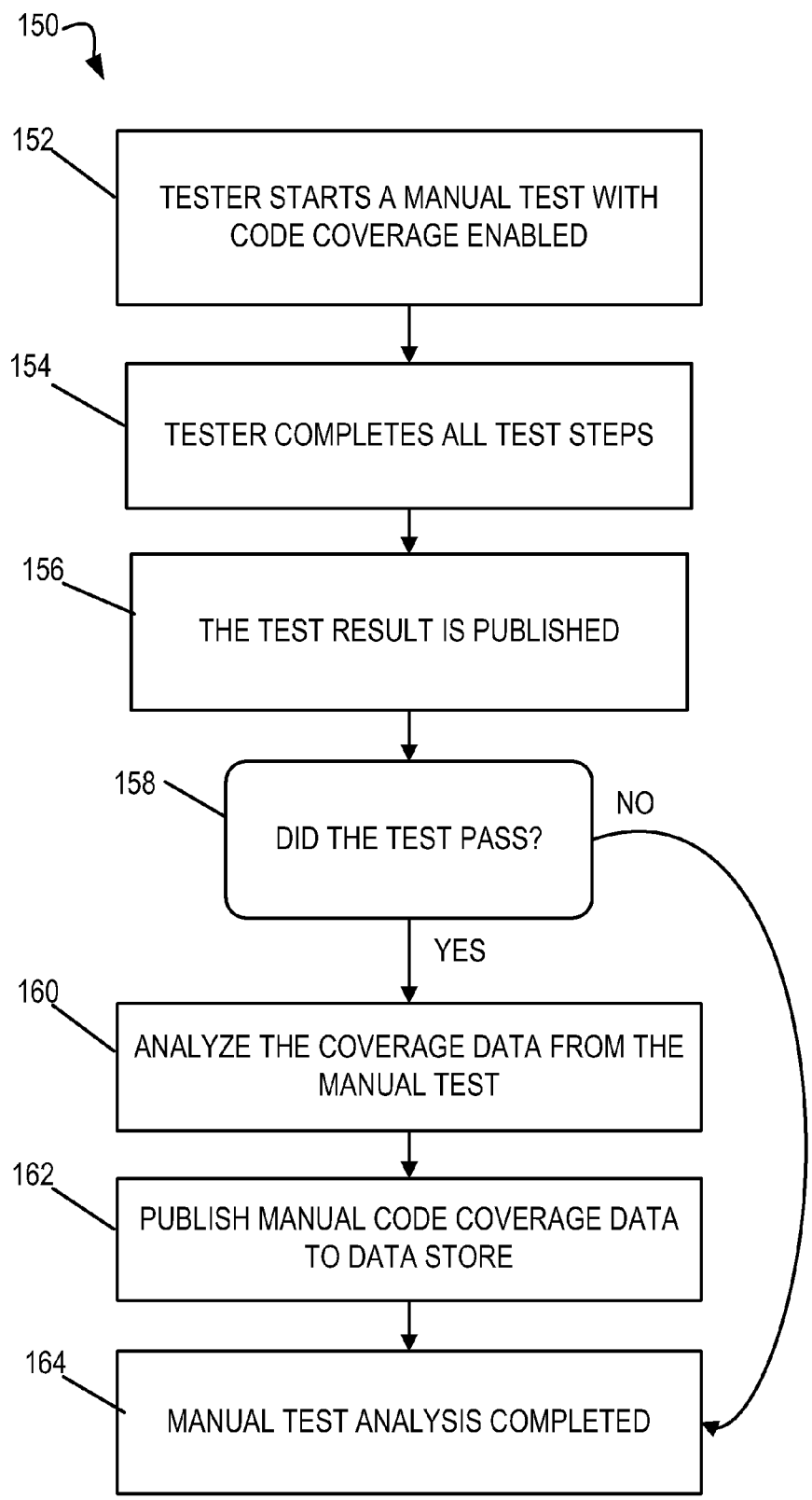
FIG. 3 is a process flow diagram for one implementation illustrating the stages involved in gathering coverage data during a manual test process.

As described in further detail in FIG. 3, manual test runner(s) 20 can be used to provide code coverage data to the data store 32 instead of or in addition to build server(s) 18. Manual test runner(s) 20 are operated by users who perform manual tests and who then upload the code coverage results of those tests to the data store 32. Similarly, third party application(s) 22 can be used to assist with gathering code coverage information that is stored in data store 32.

Once the code coverage information is gathered in data store 32, software development machine(s) 24 can interact with the data store 32 to receive real-time notifications of the impact that changes being made to source code or other application components may have on the tests. In one implementation, a three-level notification system is used to notify the user of an impact status of each test. The levels include "recommended", "verified", and "not impacted". "Recommended" means that it is recommended that the test be re-run, since the changes made to the code or other application components by the user may have impacted this particular test. "Verified" means that the test has been re-run by the user with the changed code being considered, and the test was passed. "Not impacted" means that the particular test has been determined to not be impacted by the changes made to the source code or other application components. In another implementation, a fourth level is used that includes a "not tracked" impact status. In such implementations, the "not tracked" impact status is used to identify tests that test impact information is not available for, or that otherwise are not tracked for some reason. The real-time impact notification processes are described in further detail in FIGS. 4-6.

Turning now to FIGS. 2-6 with continued reference to FIG. 1, the stages for implementing one or more implementations of test impact feedback system 10 are described in further detail. In some implementations, the processes of FIG. 2-6 are at least partially implemented in the operating logic of computing device 400 (of FIG. 7).

Figure 2:
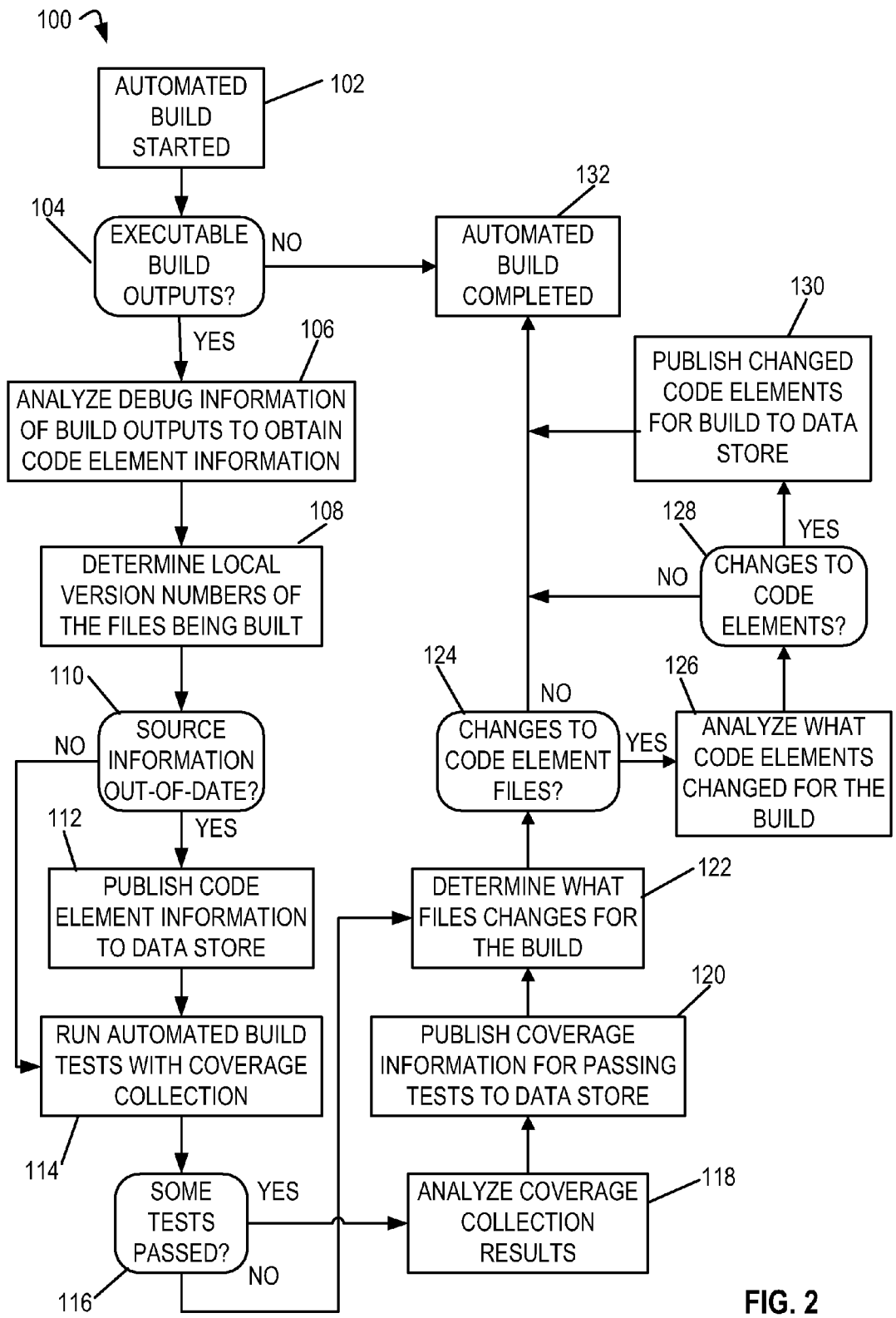
FIG. 2 is a process flow diagram for one implementation illustrating the stages involved in gathering coverage data during an automated test process.

FIG. 2 is a process flow diagram for one implementation illustrating the stages 100 involved in gathering coverage data during an automated test process. These stages are responsible for storing code element information and associations between automated build tests that passed and the impacting code elements. This data will be queried for at a later time to provide real-time feedback to the user (e.g. developer) in the form of a list of impacted tests based on the current source code or other component changes. FIG. 2 begins with an automated build being started (stage 102). If there are no build outputs that include executable files (decision point 104), then the automated build is completed (stage 132). If there are build outputs that include executable files (decision point 104), then debug information of the build outputs is analyzed to obtain code element information (stage 106). The term "code element information" as used herein is meant to include the names or identifiers of external and/or internal entry points to executable code of the software application. Examples of code element information can include source code files and the functions or procedures they contain.

Local version numbers of the files being built are determined (stage 108), and are used to determine if the source information is out-of-date (decision point 110). If the source information is out-of-date when compared to data in the data store 32 (decision point 110), then the code element information is published to the data store 32 (e.g. through the web service) (stage 112). If the source information is not out-of-date (decision point 110), or if the source information was out-of-date but the out-of-date data was published to the data store (stage 112), then the automated build tests are run with code coverage turned on (stage 114).

If none of the tests passed (decision point 116), then the process continues with stage 122 for determining file changes, as described momentarily. If some of the tests passed (decision point 116), then the code coverage collection results are analyzed (stage 118) to determine what code elements were executed during the test execution. The code coverage information for these passing tests is then uploaded to the data store (e.g. through the web service) (stage 120). Next, a determination is made as to what files changed for the build (stage 122). If there were no changes to code element files (decision point 124), then the automated build is completed (stage 132). If there were changes to code element files (decision point 124), then an analysis is performed to determine what specific code elements changed for the build (stage 126). For example, if a particular source code file was modified, then the file is analyzed to see what function changed. If there have not been any changes to the code elements inside the file (decision point 128), then the automated build is completed (stage 132). If there have been changes to code elements inside the file (decision point 128), then the changed code elements are published to the data store (e.g. through the web service) (stage 130). The automated build is then completed (stage 132). At this point in the process, the data store 32 contains code coverage information from the most recent run of the automated build test and contains code element information. This information can later be used by a software development machine to determine what tests will be impacted by changes made to source code or other elements by the user/developer. Before getting to the usage of this data, another implementation will first be discussed to illustrate how code coverage data can be gathered manually.

FIG. 3 is a process flow diagram for one implementation illustrating the stages involved in gathering coverage data during a manual test process. During this process 150, manual testers can submit passing test results after a manual test has been completed. The code coverage data that is submitted during this process can be used in addition to and/or instead of the code coverage information that was added to data store 32 as described in FIG. 2.

A tester (or other user performing the test) starts a manual test with code coverage enabled (stage 152). The tester completes all the test steps (stage 154) and publishes the results of the test (stage 156). If the tester determines that the test was not passed (decision point 158), then the manual test analysis process is completed (stage 164). The reason the process ends if the test was not passed is because failing information is not used to update the code coverage information in the data store.

If the tester indicates to the system that the test was passed (decision point 158), then the system analyzes the code coverage data from the manual test (stage 160). The system then publishes (or selects an option to publish) the code coverage data to the data store (e.g. through the web service) (stage 162). The manual test analysis process is then completed (stage 164). Once the code coverage data is gathered according to the processes of FIGS. 2 and/or 3 (or a suitable variation thereof of either or both of them), then the software development machine(s) can interact with the data store 32 to determine an impact that changes to source code or other elements will have on tests. These stages will be further illustrated in FIGS. 4-6.

Figure 4A:
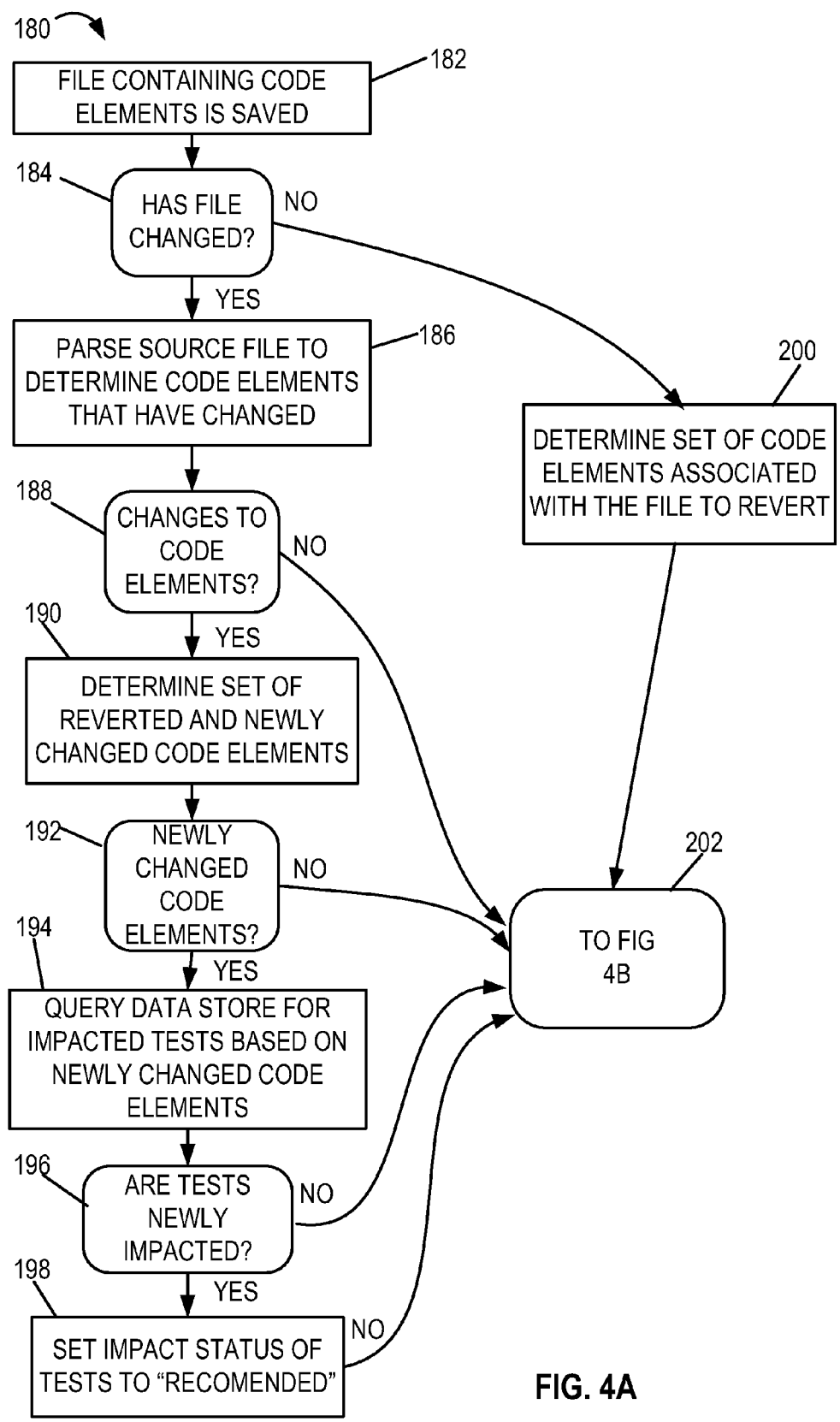
FIGS. 4A-4B are process flow diagrams for one implementation illustrating the stages involved in notifying a user of a software development environment of the possible impact his/her source code changes will have on existing tests.
Figure 4B:
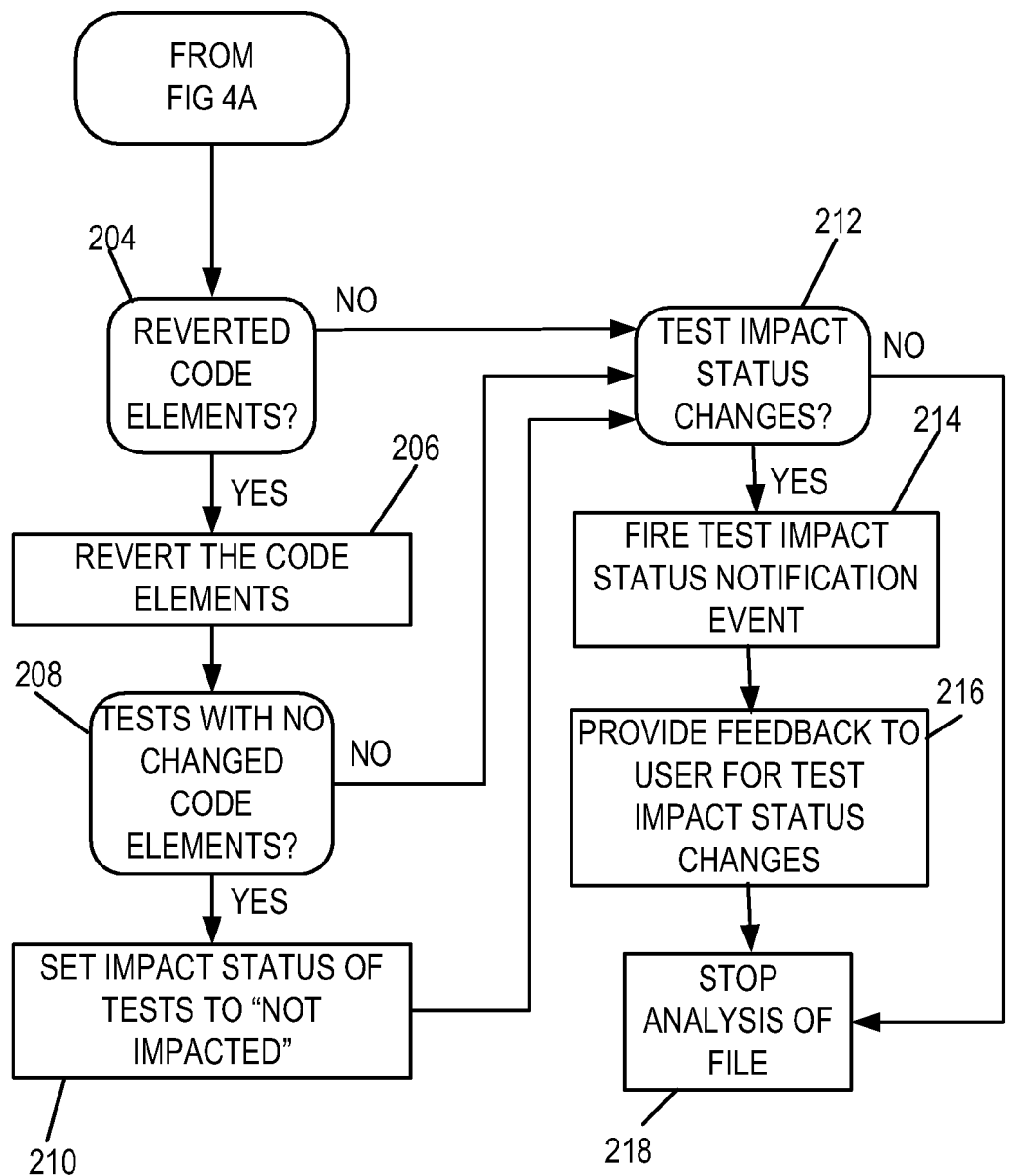

FIGS. 4A-4B are process flow diagrams for one implementation illustrating the stages 180 involved in notifying a user of a software development environment of the possible impact his/her source code changes will have on existing tests. In one implementation, the process of FIG. 4A-4B are performed while a user has one or more source code file(s) checked out from a version control system, and prior to the user checking in changes back to the version control system. A file that contains code elements is optionally saved (stage 182), such as by a user selection, automatic save process, etc. At an appropriate point in time, such as upon saving of the file, upon user selection of a verify test impact option, or based upon some other criteria, a test impact verification process is then initiated. If the file has changed (decision point 184), then the source file is parsed to determine if code elements have changed (stage 186). If code elements are determined to have not changed (decision point 188), the process resumes with FIG. 4B (stage 202) to check for reverted code elements, as discussed momentarily.

If code elements are determined to have changed (decision point 188), then a set of reverted and newly changed code elements are determined (stage 190). If newly changed code elements are not determined to exist (decision point 192), then the process resumes with FIG. 4B (stage 202) to check for reverted code elements, as discussed momentarily.

If newly changed code elements are determined to exist (decision point 192), then the data store is queried (e.g. through the web service) for impacted tests based upon the newly changed code elements (stage 194). If there are not tests impacted based upon the newly changed code elements (decision point 196), then the process resumes with FIG. 4B (stage 202) to check for reverted code elements, as discussed momentarily.

If there are tests that are impacted based upon the newly changed code elements (decision point 196), then the impact status of the affected test(s) is/are set to "recommended" (stage 198). In one implementation, the impact status is set to recommended to warn the user that he/she should verify that the changes that were made do not break application functionality (as evidenced by breaking test functionality). Next, the process resumes with FIG. 4B (stage 202) from stages 192, 196, or 198 as applicable to check for reverted code elements. Turning now to FIG. 4B, a determination is made on whether reverted code elements are present in the source file (decision point 204). Reverted code elements are code elements that show as being a change, but that are really were put back to a prior state so that there was no change. If there are not any reverted code elements present (decision point 204), then the test impact status changes are considered, as discussed momentarily (decision point 212).

If there are reverted code elements present (decision point 204), then the code elements are reverted so that they are not counted as a change (stage 206). After eliminating the reverted code elements from the count of changed code elements, if there are no code elements that have changed, then the impact status of the tests is set to "not impacted" (stage 210). After the reversion, if there are still code elements present that changed (decision point 208), then the test impact status changes are considered, as discussed momentarily (decision point 204).

If there are no test impact status changes to report to the user (decision point 212), then the analysis of the file stops (stage 218). If there are test impact status changes to report to the user (decision point 212), then a test impact status notification event is fired (stage 214). The user is provided with feedback in the development environment regarding the impact status change(s) (stage 216). In other words, the user is notified of the current status of the impact of the change on a given test, as described in further detail in FIGS. 5 and 6. As noted previously, this can occur while the user is working on a checked out version of the source file that has not been checked back in to a version control system yet. Analysis of the file then stops (stage 218).

Figure 5:
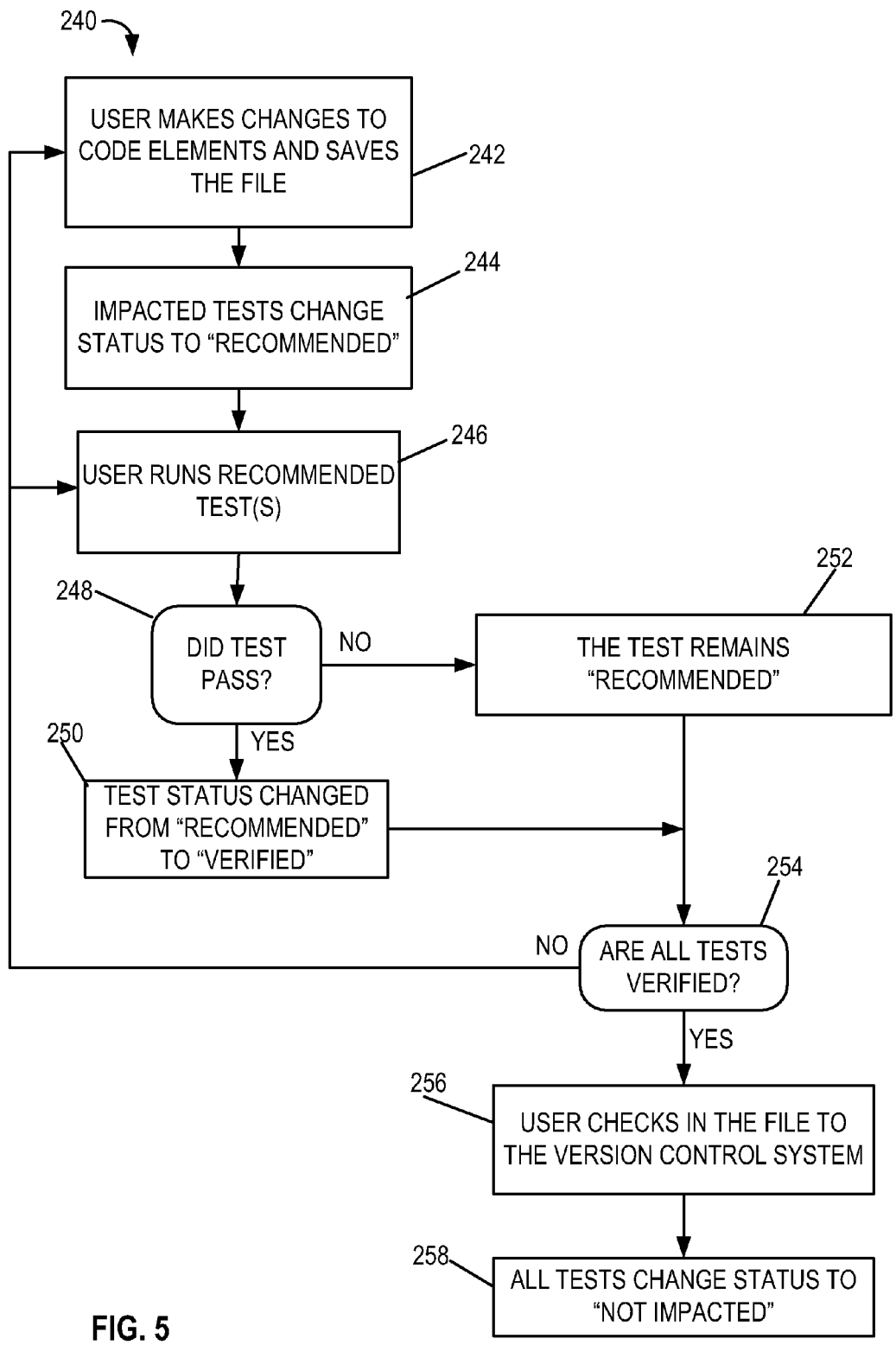
FIG. 5 is a process flow diagram for one implementation illustrating the stages involved in managing and/or updating the status of the possible test impact based on user actions.

FIG. 5 is a process flow diagram for one implementation illustrating the stages 240 involved in managing and/or updating the status of the possible test impact based on user actions. The user (e.g. developer) makes changes to the code elements and optionally saves the file (stage 242), and impacted tests are set to "recommended" (stage 244), as previously described in detail for one implementation in FIG. 4A-4B. The user runs the recommended tests (stage 246). If the change passes the test (decision point 248), then the test status is changed from "recommended" to "verified" for the given test (stage 250). If the change does not pass the given test (decision point 248), then the test remains in the "recommended" status (stage 252). If any tests are not in a verified status (decision point 254), then the stages repeat with the user either running additional tests and further assessing the impact (starting at 246), or with the user making further changes to the code elements and further assessing the impact (starting at 242). For example, if the user has verified only half of the tests, then he/she may need to verify the other have of the tests, potentially without need to modify the source code. In some cases, the source code may need to be modified in order for the tests to all be verified.

Once all tests that were in the "recommended" stage are in the "verified" stage (decision point 254), then the user can check in the file to the version control system (stage 256). At that point, all tests are given a status of "not impacted" since they all have been verified. Note that in another implementation, the user can check in the file to the version control system even if some tests are still in a recommended stage, but a warning or other notification can be provided to indicate that this check-in violates the desired practice.

FIG. 6 is a simulated screen 300 for one implementation illustrating an exemplary notification list that identifies which tests have a "recommended" for verification status 302, which tests have a "verified" status 304, and which tests have a "not impacted" status 306. In the example shown, the tests of a given status can be expanded and collapsed for ease of viewing. In other implementations, the notifications can be displayed in a single notification per test, in a list that just includes those tests having a given status, and/or in other variations as would occur to one of ordinary skill in the computer software art for notifying a user of the status code changes may have on a given test. Furthermore, while three status indicators were used in the examples discussed herein, it will be appreciated that different, fewer, and/or additional status indicators could be used in alternate implementations.

Figure 7:
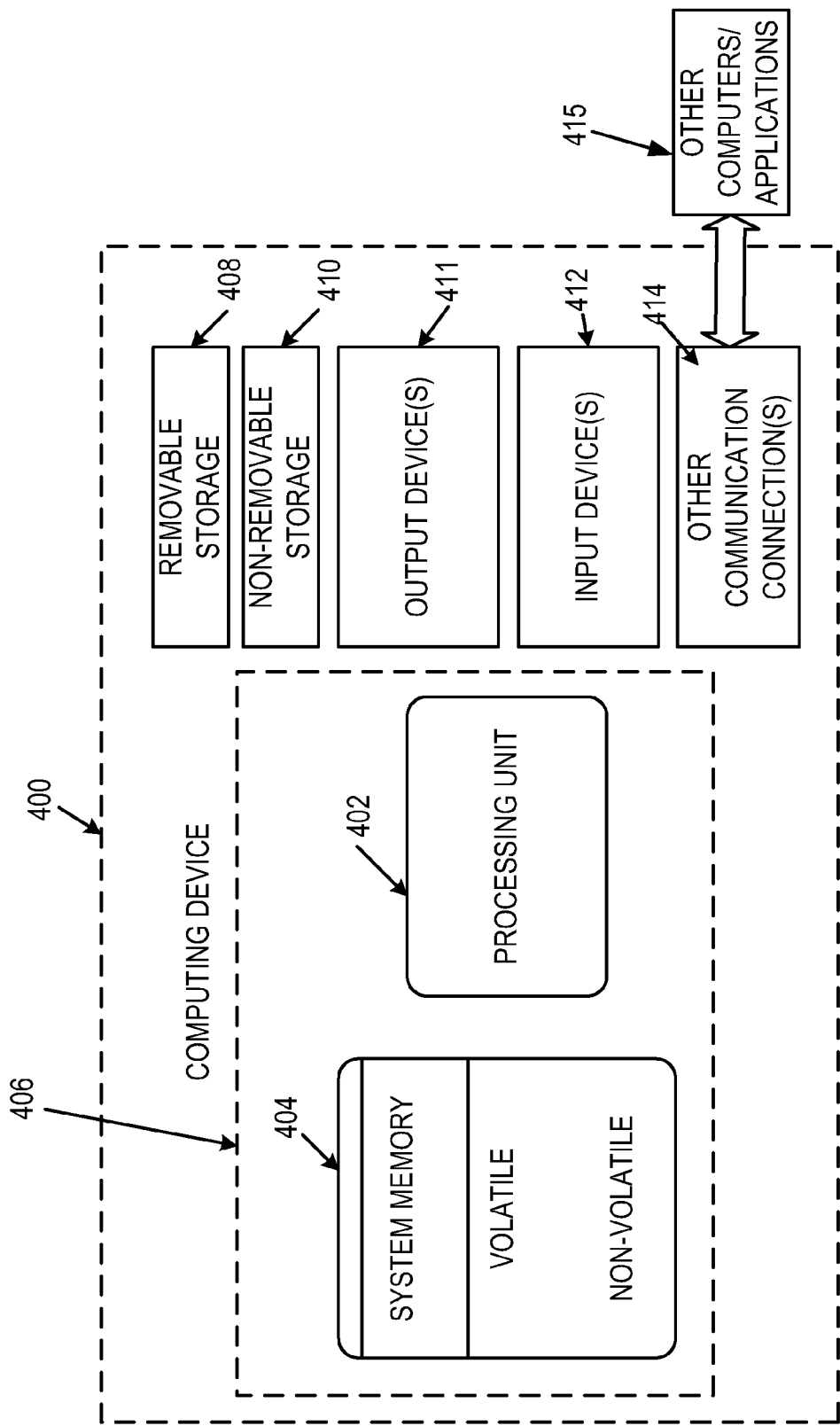
FIG. 7 is a diagrammatic view of a computer system of one implementation.

As shown in FIG. 7, an exemplary computer system to use for implementing one or more parts of the system includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as ROM, flash memory, etc.) or some combination of the two. This most basic configuration is illustrated in FIG. 7 by dashed line 406.

Additionally, device 400 may also have additional features/functionality. For example, device 400 may also include additional storage (removable and/or non-removable) including, but not limited to, magnetic or optical disks or tape. Such additional storage is illustrated in FIG. 7 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Computing device 400 includes one or more communication connections 414 that allow computing device 400 to communicate with other computers/applications 415. Device 400 may also have input device(s) 412 such as keyboard, mouse, pen, voice input device, touch input device, etc. Output device(s) 411 such as a display, speakers, printer, etc. may also be included. These devices are well known in the art and need not be discussed at length here. In one implementation, one or more portions of test impact feedback system 10 are at least partially implemented in the operating logic of computing device 400.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable storage medium having computer executable instructions for causing a computer to perform steps comprising:
   determining whether a count of changed code elements contained in at least one source code file includes one or more reverted code elements;
   in response to a determination that the count of the changed code elements includes one or more reverted code elements, eliminating the one or more reverted code elements from the count of the changed code elements to provide remaining changes;
   analyzing the remaining changes contained in the at least one source code file in combination with code coverage information contained in a data store for a plurality of tests, to determine when any of the tests will be impacted by the remaining changes; and
   when at least one test is determined to be impacted by the remaining changes, displaying a warning notification to a user to notify the user of a possible impact of the remaining changes on the at least one test.

2. The computer-readable storage medium of claim 1, further having computer-executable instructions for causing a computer to perform steps comprising:
   when at least one test is determined to not be impacted by the remaining changes, displaying an informational notification to the user to notify the user that the test is not impacted by the remaining changes.

3. The computer-readable storage medium of claim 1, wherein the data store is accessed through a web service.

4. The computer-readable storage medium of claim 1, wherein at least a portion of the code coverage information is populated in the data store from an automated build test that was executed with code coverage collection turned on.

5. The computer-readable storage medium of claim 1, wherein at least a portion of the code coverage information is populated in the data store from a manual test that was performed by a user.

6. The computer-readable storage medium of claim 1, wherein the notification comprises a recommendation that the user run the test against the remaining changes in the source code file to verify that the changes do not break application functionality.

7. The computer-readable storage medium of claim 1, wherein the warning notification is displayed while the source code file is checked out from a version control system.

8. The computer-readable storage medium of claim 1, wherein the computer executable instructions include instructions for causing the computer to perform the determining step automatically in response to the changes being saved to the at least one source code file.

9. A method for providing test impact feedback to a user using at least one processing unit, comprising the steps of:
   determining that at least one newly changed code element is present in a plurality of code elements that are contained in a file;
   determining that the at least one newly changed code element includes at least one reverted code element;
   eliminating the at least one reverted code element from a count of the at least one newly changed code element to provide at least one remaining newly changed code element;

querying a data store for code coverage information to determine if any tests are impacted based upon the at least one remaining newly changed code element; and when a test is determined to be impacted based upon the at least one remaining newly changed code element, displaying an impact status of the test to a user.

10. The method of claim 9, wherein the impact status is a recommended status.

11. The method of claim 10, wherein the recommended status indicates that the test will likely be impacted by the at least one remaining newly changed code element.

12. The method of claim 9, further comprising the steps of: receiving a selection from a user to run the test against the changes.

13. The method of claim 12, further comprising the steps of: when the test is passed, changing the impact status to a verified status.

14. The method of claim 12, further comprising the steps of: when the test fails, keeping the impact status in the recommended status.

15. The method of claim 9, wherein the determining steps, the querying step, and the displaying step are repeated for a plurality of changed code elements.

16. The method of claim 15, wherein the user is not allowed to check the file into a version control system until a status of all tests that originally had a recommended status have been changed to a verified status.

17. The method of claim 9, wherein the impact status is displayed while the file is checked out from a version control system.

18. The method of claim 9, wherein the determining steps are performed automatically in response to the one or more newly changed code elements being saved to the file.

19. A system for providing test impact feedback to a user, the system comprising:

a processing unit; and a memory containing a program, which, when executed by the processing unit, is configured to determine whether a count of changed code elements contained in at least one source code file includes one or more reverted code elements;

in response to a determination that the count of the changed code elements includes one or more reverted code elements, eliminate the one or more reverted code elements from the count of the changed code elements to provide remaining changes;

analyze the remaining changes contained in the at least one source code file in combination with code coverage information contained in a data store for a plurality of tests to determine when any of the tests will be impacted by the remaining changes; and when at least one test of the plurality of tests is determined to be impacted by the remaining changes, display a warning notification to a user in real-time to notify the user of a possible impact of the remaining changes on the at least one test.

20. The system of claim 19, wherein the program, when executed by the processing unit, is further configured to display an informational notification to the user to notify the user that at least one second test of the plurality of tests is not impacted by the remaining changes when the at least one second test is determined to not be impacted by the remaining changes.

21. The system of claim 19, wherein the warning notification includes a recommendation that the user run the plurality of tests against the remaining changes in the at least one source code file to verify that the remaining changes do not break application functionality.

22. The system of claim 19, wherein the program, when executed by the processing unit, is configured to display the warning notification while the at least one source code file is checked out from a version control system.

23. The system of claim 19, wherein the program is configured to determine whether the count of the changed code elements includes one or more reverted code elements, automatically in response to the changed code elements being saved to the at least one source code file.

* * * * *